Patented Feb. 18, 1930

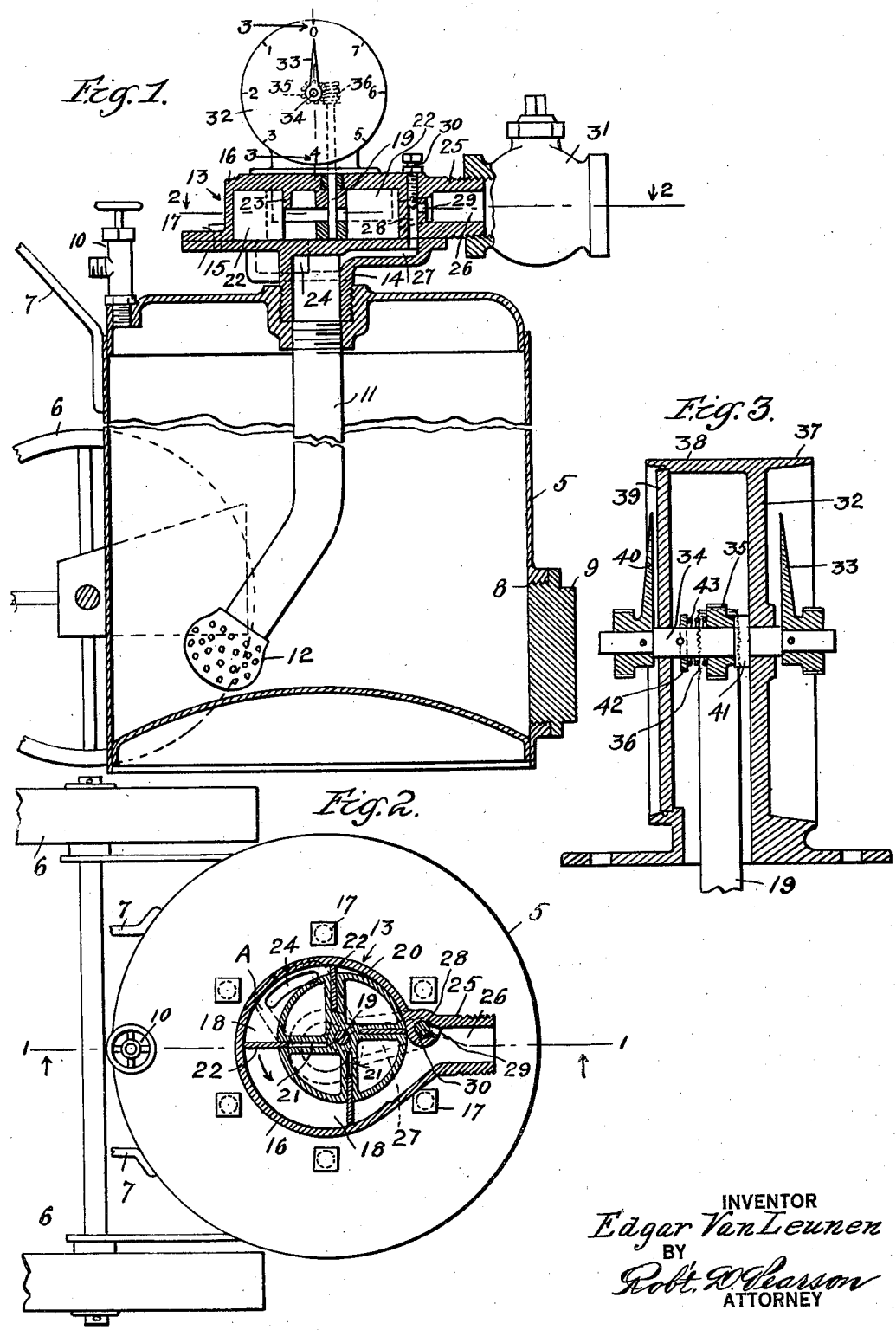

1,747,337

UNITED STATES PATENT OFFICE

EDGAR VAN LEUNEN, OF LOS ANGELES, CALIFORNIA, ASSIGNOR TO THEODORE S. HERLIHY AND EUGENE W. COOPER, BOTH OF LOS ANGELES, CALIFORNIA

GREASE DISPENSER

Application filed August 29, 1927. Serial No. 216,228.

This invention relates to grease dispensers and more particularly to a measuring meter associated therewith whereby the quantity of grease passing from the grease container may be accurately measured.

The object of the invention is to provide an apparatus of the above mentioned type which will be simple of construction, durable and efficient and which may be adjusted so as to be accurate in the measuring of the grease of any density by weight.

The above and other objects of the invention will be more fully disclosed in the following description and will be exemplified in the accompanying drawings, in which;

Figure 1 is a vertical section through a grease tank and the measuring meter taken on the irregular line 1—1 indicated on Figure 2 of the drawings.

Figure 2 is a plan section of the same taken approximately on the line 2—2 of Figure 1.

Figure 3 is a section taken on line 3—3 of Figure 1.

In carrying out the invention 5 represents an air tight grease tank which is preferably mounted on wheels 6 and is provided with a suitable handle 7. A threaded aperture 8 is formed in the wall of the tank adjacent its bottom through which the tank may be filled with grease and when filled the aperture may be sealed by the threaded plug 9.

The top of the tank is provided with an inlet valve 10 through which compressed air may be admitted into the tank, and a threaded aperture into which is threaded a pipe 11 which extends downwardly into the tank and has on its lower end a strainer 12.

A meter casing 13 is disposed above the tank and is provided with a threaded hollow boss 14 which is threaded into the aperture in alignment with the pipe 11, the bore of said boss communicating with the bore of said pipe.

The casing 13 comprises a base 15 on which the boss 14 is formed and an annular housing 16 which is secured to said base by means of the screws 17 thus forming an annular chamber 18.

Journaled eccentrically in the housing 16 is a shaft 19 upon the lower end of which is secured a rotor 20 which is disposed in the chamber 18 and is provided with a plurality of approximately radially disposed guideways 21 in which are mounted blades 22 the outer edges of said blades contacting with the inner circular surface of the chamber 18 and the inner edges of the blades contacting with the outer peripheral surface of a downwardly depending annular boss 23 forming a part of the housing 13. The upper and lower edges of the blades contact respectively with the inner and upper surfaces of the housing 13 and base 15.

A passage 24 is forced in the base 15 and opens communication between the bore of boss 14 and the space between the walls of the rotor and the housing 13.

The housing 13 is provided with a threaded boss 25 having a centrally disposed outlet port 26 which communicates with the chamber 18.

The base 15 is provided with a second or by pass passage 27 which communicates with the bore of boss 14, and the housing 13 is provided with a bore 28 which communicates with said passage, and a port 29 is formed in the housing which opens communication between the bore 28 and the outlet port 26, and in order to regulate the flow of the grease through passage 27 to the outlet port 26, a valve stem 30 is threaded into bore 28 adapted to open or close the port 29 as desired.

The port 26 is provided with a valve 31 which is adapted, when desired, to cut off the flow of grease through port 26.

Mounted above the housing 13 is an indicating mechanism, which comprises the dial 32 and the pointer 33. The pointer 33 is secured to a shaft 34 journaled in suitable bearings and upon which is secured a worm gear 35, said gear being adapted to engage with a worm 36 secured to the upper end of shaft 19.

The dial 32 forms a part of a housing 37 provided with an annular flange 38 to which is secured a disc 39 which forms another dial which is oppositely disposed, and secured to the shaft 34 is another pointer 40 adapted to cooperate with the dial 39.

In order that the pointers may be readily moved back to zero after a quantity of dispensed grease has been measured and registered, the worm gear 35 is only frictionally secured to the shaft 34 and to this end the following mechanism is employed.

The shaft 34 is provided with a collar 41 which is secured thereto, and the worm gear 35 is loosely journaled on the shaft 34, one of its faces abutting one face of said collar.

A washer 42 is secured to the shaft 34 and between the face of said washer and the opposite face of said collar a spring 43 is interposed and surrounds the shaft.

By this arrangement it will be obvious that upon revolution of the shaft 19 the worm gear 35 will be caused to revolve and due to its frictional contact with the collar 41 on shaft 34 will cause said shaft to revolve and carry the pointers around.

When the pointers are set back the shaft 34 will revolve in the bore of the gear 35 said gear being held from rotation by the worm on shaft 19.

In utilizing the invention the tank 5 is first filled with the grade of grease desired to be dispensed, which is introduced through the opening 8. The port 8 may be then closed by means of the plug 9 and air under pressure is then admitted into the tank through the inlet 10. The grease is thereby forced through the pipe 11 through passage 24 into the pocket A formed between adjacent blades 22. The rotor is thereby caused to revolve in the direction indicated by the arrow shown in Figure 2 and the quantity of grease is measured therein and carried around and delivered through the bore 26 past the valve 31 to its destination. The rotation of the rotor through its connection with the indicating pointer 33 causes said pointer to rotate and indicate the number of revolutions of said rotor and consequently the quantity of grease delivered.

After the indicator registers one pound the grease delivered is weighed and if found short of the indicated weight the valve 30 is then adjusted to permit a sufficient quantity of grease to pass through the by pass port 29 to compensate for the shortage.

After the indicator has been thus calibrated the valve 30 may be locked in any suitable manner, and future delivery of grease of the same density will thus be accurately measured.

It will be seen that by my invention a grease dispensing device is provided wherein the supply conduit enters the casing of the rotor laterally rather than tangentially, and this arrangement, in combination with the regulating by-pass 27 which is led through a radially extending swell in the side of the casing and then is extended through the wall of the horizontal pipe or outlet extension 25, adapts the device to be mounted with one side or lateral face in close proximity to the horizontal top of the supply tank, and in conjunction with this the adjusting stem 30 of the by-pass regulating valve is located on the upper side of the casing of the device where it is at all times readily accessible.

Having thus described my invention what I claim is:

1. A grease meter comprising a flat cylindrical casing having a chamber, grease driven means in said chamber, said casing having a radial outlet passage, said casing being provided with a lateral extension adapted for attachment to a source of supply, said extension having therethrough an inlet passage to supply grease to drive the means in the chamber and a by-pass outside of the chamber leading through a radial rise or swell in the lower side of the casing and forming a by-pass leading from said intake passage to said outlet passage, and a valve having a stem projecting through the casing adjacent to said outlet passage, said valve being adapted to adjust the size of the opening through said passage.

2. A grease meter comprising a flat cylindrical casing having a chamber, grease driven means in said chamber, said meter being so arranged that said grease driven means revolves in a horizontal plane, said casing having a radial outlet and having also a lateral extension therebeneath adapted for attachment to a source of supply, there being an inlet passage through said extension to afford communication between said source of supply and chamber, there being also a by-pass leading horizontally from said inlet passage to a point beneath and near to said outlet passage, said by-pass having an upwardly extending terminal portion leading into said outlet passage, and a valve within said terminal portion of said by-pass, said valve having a stem leading through the casing of the meter and accessible thereabove for the purpose of adjusting the size of the passage controlled by said valve.

In testimony whereof I hereunto affix my signature.

EDGAR VAN LEUNEN.